Jan. 1, 1952 R. C. MATHES 2,580,685

COLOR TELEVISION WITH REDUCED BAND WIDTH

Filed Dec. 30, 1949

INVENTOR
R. C. MATHES
BY Hugh S. Wertz
ATTORNEY

Patented Jan. 1, 1952 2,580,685

UNITED STATES PATENT OFFICE 2,580,685

COLOR TELEVISION WITH REDUCED BAND WIDTH

Robert C. Mathes, Summit, N. J., assignor to Bell Telephone Laboratories, Incorporated, New York, N. Y., a corporation of New York Application December 30, 1949, Serial No. 136,064

6 Claims. (Cl. 178—5.2)

This invention relates to the translation, transmission, reception, and reproduction of television image signals, and particularly of color television image signals.

The principal object of the invention is to effect a substantial reduction in the width of the frequency band required for the transmission of such signals, as compared with the band width required when the transmission is effected by apparatus and in accordance with methods commonly in use.

In Electronics, March 1947, pages 80 and 81, there is described the R. C. A. "mixed-highs" system of simultaneous color television, in which each color channel is broken into two parts, one carrying the lower frequencies or broad areas and the other the higher frequencies or fine detail. The lower frequency channels are transmitted as generated, but the high frequency bands are mixed together and transmitted as one band. These "mixed-high" frequency signals are then added to each of the three color channels at the receiver. Thus, fine details in the ultimate image appear in black and white accents rather than in color.

In accordance with the present invention and in furtherance of its broad object, the "mixed-high" frequency signals are stored in a storage device and rescanned at a low rate for transmission in a narrower band. At the receiving end of the system, the slowed-up "mixed-high" frequency signals are again stored and again scanned at an appropriate rate to restore them to their normal high frequency location in the video band. For all parts of the scene which are not in motion, the fine detail is thus completely reproduced. For those parts of the picture representing motion, the reproduction of such motion is carried by the low frequency bands in each color. For many rates of motion, the fine detail will lag due to the storage process used in reducing the band width, but it is a psychological fact that as high a degree of definition is not required for an acceptable presentation of a moving object as is required for a fixed scene. Hence, the high definition which is supplied by the high frequencies is retained for those parts of the scene where it is necessary and discarded for those parts for which its retention is unimportant.

Figure 1:
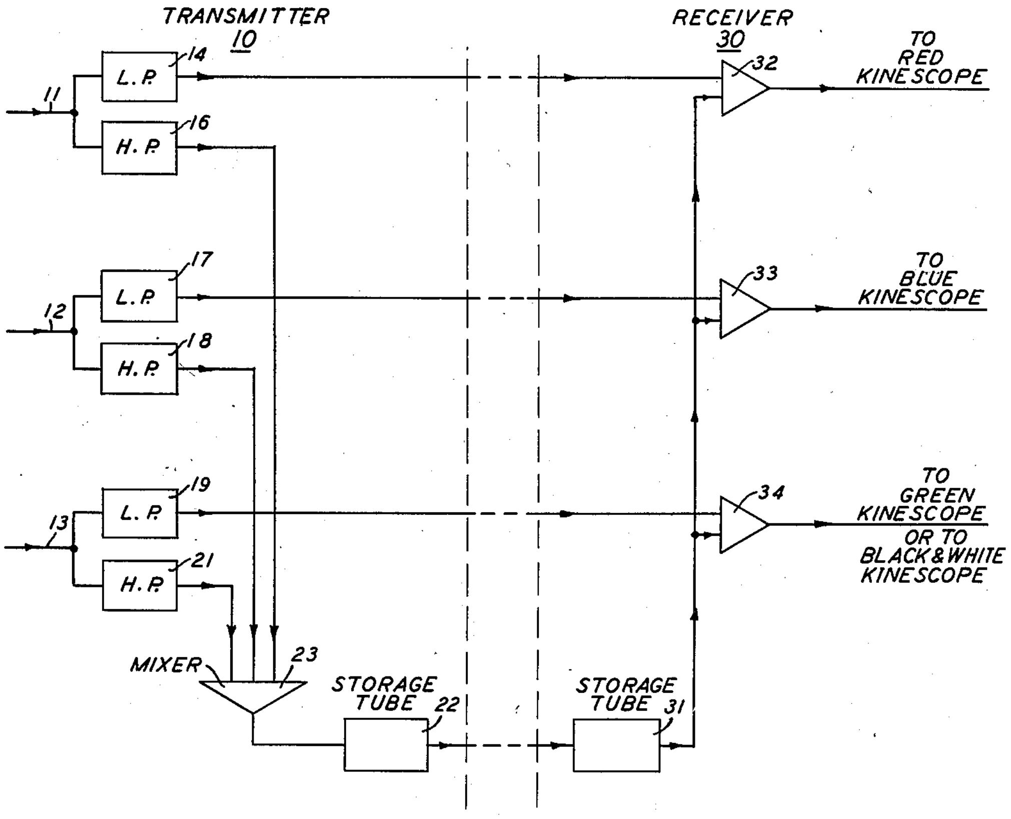
Figure 2:
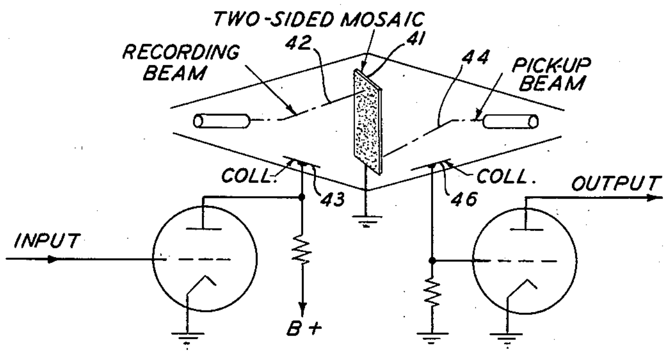

The invention will be more fully understood by reference to the following detailed description taken in connection with the accompanying drawings, forming a part thereof, in which:

Fig. 1 is an over-all block diagram of an illustrative embodiment of the invention; and Fig. 2 shows schematically a representative type of storage tube which can be used in the practice of the invention.

In accordance with the invention, one simple and convenient illustrative embodiment is that shown in Fig. 1. As there indicated, at the transmitter 10, a conventionally generated "red" video signal 11 is split into two transmission paths containing complementary low-pass and high-pass filters 14 and 16. Similarly, a conventionally generated "blue" signal 12 is split into two components by low-pass filter 17 and high-pass filter 18, while a conventionally generated "green" signal 13 is split into two components by low-pass filter 19 and high-pass filter 21. In an exemplary arrangement, the transmission band of low-pass filters 14, 17, and 19 can extend from zero frequency to approximately ten (to twenty) per cent of the normal top video frequency; while that of the high-pass filters 16, 18, and 21 can start at about ten (to twenty) per cent of the normal maximum frequency. The signals from the low-pass filters are transmitted directly in accordance with standard practice, but the high-pass signals are mixed in an electronic mixer 23, in accordance with well-known electronic techniques, and the resultant signal is then recorded on the mosaic of a storage tube 22. The details of one such general type of tube, which has been described in the literature (see, e. g., Zworykin and Morton, Television, (1940), page 326 et seq.) are shown in Fig. 2.

This tube has a two-sided mosaic consisting of an array of particles embedded in, but insulated from, a grounded conductive plate 41 in such a way as to be accessible to scanning electron beams on either side. The electrical properties are such as to yield a secondary emission ratio appreciably greater than unity upon bombardment by the recording beam 42. The "mixed-high" frequency signal is applied to the recording collector electrode 43 while a constant strength recording beam 42 scans the mosaic repeatedly in synchronism with the original picture scan. Then, if the beam current is sufficiently high, the potential of the group of particles bombarded by the beam at any given instant is related directly to the instantaneous collector potential, e. g., slightly positive with respect thereto. Thus, a complete charge "image" corresponding to the original picture is stored on the mosaic by each frame scan. It is to be noted that this process requires no separate erasing operation, since the recording beam drives each particle up or down to the proper potential at each passage.

The pick-up beam 44 scans the other side of the mosaic in the same geometrical pattern or raster as the recording scan, but at a much lower repetition rate, which, to choose an illustrative value, can be one-tenth to one-fifth of the recording rate. Pick-up beam current is assumed to be sufficiently low so that no appreciable discharging of the mosaic signal is caused by this scan. Then the current to the pick-up collector 46 at any given instant is proportional to the potential of the group of particles under the monitoring beam, and the outgoing collector signal is thus a slowly repeated version of the original mixed high frequency color by-pass signal.

At the receiving point 30, the modified (i. e., having a reduced repetition rate) fine structure signal is stored in a storage tube 31 similar to the one used at the transmitting point, but the recording scan is now carried out at the low repetition rate and the pick-up scan at the original high repetition rate, thereby producing an output time signal identical with the original fine structure signal when there is no motion in the televised scene. This reconverted signal is then added in summation amplifiers 32, 33, and 34 to the respective received coarse field color information signals to form complete "red," "blue," and "green" video signals once more, which signals can be used to reproduce the television image in the usual way. It is also in accordance with the invention to superpose the "mixed-high" frequency signal upon only one of the receiver color patterns, in embodiments of the invention where such high frequency presentation is adequate.

The advantages of this arrangement in effecting band width economy will be readily apparent from an examination of certain illustrative values which may be considered to be typical of examples of practice of the invention. It may be assumed that a typical high-definition three-color television system requires a band width of approximately four megacycles for each color plus a 25-per cent margin for channel separation, i. e., a total band width of $4\times3\times1.25=15$ megacycles. Sending these same color signals in accordance with the present invention, with $f_c$ (the top frequency of the low-pass filters) set equal to 10 per cent of the normal top video frequency, each of the low frequency color bands occupies only 400 kilocycles, while the mixed highs occupy 3.6 megacycles. The mixed highs, however, are sent, let us say, at one-tenth the normal repetition rate, so that the band required for the highs is only 360 kilocycles. Allowing a 25-per cent margin for channel separation, it is seen that the band requirements are three 500-kilocycle low frequency bands and one 450-kilocycle mixed high frequency band, a total of 1.95 megacycles, as compared with the 15 megacycles required by conventional three-color techniques.

In another example of practice, $f_c$ can be 20 per cent of the normal top video frequency, and the high frequency repetition rate can be one-fifth that at the low frequencies. It is evident that the band requirements in this case are three 1.0-megacycle low frequency bands and one 800-kilocycle mixed high frequency band, a total of only 3.8 megacycles, as compared with the conventional 15 megacycles. These values are by no means the only ones which can be employed in the practice of the invention but are merely typical of two examples of practice and are offered as indications of the band width economy which is effected by the invention in all its embodiments.

It is to be understood that the above-described arrangements are illustrative of the application of the principles of the invention. Numerous other arrangements may be devised by those skilled in the art without departing from the spirit and scope of the invention.

What is claimed is:

1. In a multicolor television system in which there are separate signals each representative of an individual color component of a television image, means for separating from each other the high and low frequency components of each of said color components, means for mixing the high frequency components of each of the color components, means for transmitting the low frequency components of each of the color components at one repetition rate, means for transmitting said mixed high frequency components at another, reduced, repetition rate, means at the receiving station to restore said mixed high frequency components to their original repetition rate, and means at the receiving station to combine said restored-rate mixed high frequency components with at least one of the low frequency color components so as to yield a composite high and low frequency signal.

2. In a multicolor television system in which there are separate signals each representative of an individual color component of a television image, means for separating from each other the high and low frequency components of each of said color components, means for mixing the high frequency components of each of the color components, means for transmitting the low frequency components of each of the color components at one repetition rate, means for transmitting said mixed high frequency components at another, reduced, repetition rate, means at the receiving station to restore said mixed high frequency components to their original repetition rate, and means at the receiving station to combine a portion of said restored-rate mixed high frequency components with each of the low frequency color components so as to yield a composite high and low frequency signal for each color component.

3. In a multicolor television system in which there are separate signals each representative of an individual color component of a television image, means for separating from each other the high and low frequency components of each of said color components, said separating means comprising for each color component complementary high-pass and low-pass electrical filters such that each of said low-pass filters is adapted to transmit freely only those frequencies less than a frequency $f_c$ and each of said high-pass filters is adapted to transmit freely only those frequencies greater than said frequency $f_c$, where $f_c$ is a predetermined fraction of the maximum frequency to be found in the color component video signal, means for mixing the high frequency components of each of the color components, means for transmitting the low frequency components of each of the color components at one repetition rate, means for transmitting said mixed high frequency components at another, reduced, repetition rate, means at the receiving station to restore said mixed high frequency components to their original repetition rate, and means at the receiving station to combine a portion of said restored-rate mixed high frequency components with each of the low frequency color components so as to yield a composite high and low frequency signal for each color component.

4. In a multicolor television system in which there are separate signals each representative of an individual color component of a television image, means for separating from each other the high and low frequency components of each of said color components, means for mixing the high frequency components of each of the color components, means for transmitting the low frequency components of each of the color components at one repetition rate, means for transmitting said mixed high frequency components at another, reduced, repetition rate, said means for transmitting the fine components at a reduced repetition rate comprising a storage tube device including a recording mosaic, a recording beam, and a pick-up beam, in which the recording beam is moved over the recording mosaic in a certain geometrical pattern and at a certain repetition rate and the pick-up beam is moved in the same geometrical pattern but at a lower repetition rate, means at the receiving station to restore said mixed high frequency components to their original repetition rate, and means at the receiving station to combine a portion of said restored-rate mixed high frequency components with each of the low frequency color components so as to yield a composite high and low frequency signal for each color component.

5. In a multicolor television system in which there are separate signals each representative of an individual component of a television image, means for separating from each other the high and low frequency components of each of said color components, means for mixing the high frequency components of each of the color components, means for transmitting the low frequency components of each of the color components at one repetition rate, means for transmitting said mixed high frequency components at another, reduced, repetition rate, means at the receiving station to restore said mixed high frequency components to their original repetition rate, said last-mentioned means comprising a storage tube device including a recording mosaic, means for producing a recording beam and a pick-up beam, means for moving said recording beam over said mosaic in a certain geometrical pattern and at a certain repetition rate, and means for moving said pick-up beam over said mosaic in the same geometrical pattern but at a greater repetition rate, and means at the receiving station to combine a portion of said restored-rate mixed high frequency components with each of the low frequency color components so as to yield a composite high and low frequency signal for each color component.

6. In a multicolor television system in which there are separate signals respectively representative of the red, blue and green components of a television image, means for separating from each other the high and low frequency components of each of said color components, means for mixing the high frequency components of each of the color components, means for transmitting the low frequency components of each of the color components at one repetition rate, means for transmitting said mixed high frequency components at another reduced, repetition rate, means at the receiving station to restore said mixed high frequency components to their original repetition rate, and means at the receiving station to combine a portion of said restored-rate mixed high frequency components with the respective red, blue and green low frequency color components so as to yield a composite high and low frequency red signal, blue signal and green signal.

ROBERT C. MATHES.

REFERENCES CITED

The following references are of record in the file of this patent:

UNITED STATES PATENTS

| Number | Name | Date |
|---|---|---|
| 2,219,021 | Riesor | Oct. 22, 1940 |
| 2,277,516 | Henroteau | Mar. 24, 1942 |
| 2,293,899 | Hanson | Aug. 25, 1942 |
| 2,454,652 | Iams | Nov. 23, 1948 |

FOREIGN PATENTS

| Number | Country | Date |
|---|---|---|
| 906,982 | France | June 4, 1945 |
| 928,783 | France | June 16, 1947 |
| 932,934 | France | Dec. 17, 1947 |

OTHER REFERENCES

"Six Megacycle Compatible Color Television System," by RCA (September 1949, pages 2 and 11).